United States Patent

Arsac et al.

[11] 4,056,367
[45] Nov. 1, 1977

[54] LIQUID MONOAZO-NAPHTHALENE DYESTUFFS, AND THEIR USE

[75] Inventors: Aime Joseph Arsac, Condrieu; Pierre Frank, Saint Clair du Rhone, both of France

[73] Assignee: Produits Chimiques Ugine Kuhlmann, Paris, France

[21] Appl. No.: 585,546

[22] Filed: June 10, 1975

[30] Foreign Application Priority Data

June 28, 1974 France .................. 74.22597

[51] Int. Cl.² .................. C10L 1/10; C09B 29/06; C07C 107/04; C07C 107/08
[52] U.S. Cl. ...................... 44/59; 260/194; 260/195; 260/196; 8/6
[58] Field of Search ............ 260/194, 195, 196, 42.21; 8/6, 6.5; 44/59; 106/22, 23

[56] References Cited

U.S. PATENT DOCUMENTS

| | | | |
|---|---|---|---|
| 2,850,493 | 9/1958 | Seruto | 260/195 X |
| 3,534,016 | 10/1970 | Lange | 260/196 X |
| 3,734,857 | 5/1973 | Moiso et al. | 44/59 X |

Primary Examiner—Charles F. Warren
Attorney, Agent, or Firm—Beveridge, DeGrandi, Kline & Lunsford

[57] ABSTRACT

Liquid dyestuffs of the general formula:

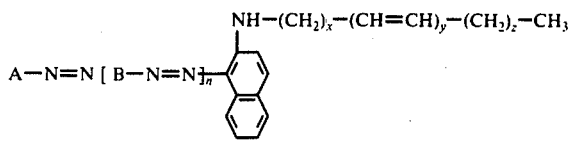

in which A and B each represent the residue of an aromatic benzene or naphthalene primary amine, possibly substituted by alkyl or alkoxy groups containing 1 to 2 carbon atoms, $n$ represents 0 or 1, $y$ represents 0 or 1, $x$ and Z each represent a whole number such that the sum $x + y + z$ is a whole number from 5 to 17, a process for the preparation of such dyestuffs in which there is coupled in aqueous medium the diazo derivative of an amine of the general formula:

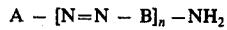

in which A, B, n have the same significance as in claim 1, with a compound of the formula:

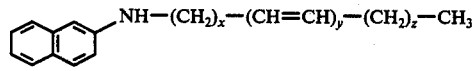

in which x, y and z have the same significance as above, and the use of these dyestuffs for the coloration of petroleum products, inks, fats, waxes and plastics material.

8 Claims, No Drawings

LIQUID MONOAZO-NAPHTHALENE DYESTUFFS, AND THEIR USE

The present invention relates to new liquid mono- or dis-azo dyestuffs, which are insoluble in water and miscible in all proportions with aliphatic or aromatic organic solvents, to their preparation and to their use for the colouration of petroleum products, inks, fats, waxes, or plastics materials which they colour in shades from orange to violet.

According to the present invention liquid azo-naphthalene dyestuffs are provided having the general formula:

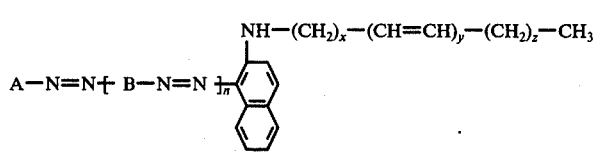
(I)

in which A and B each represent the residue of an aromatic benzene or naphthalene primary amine, which may be substituted by at least one alkyl or alkoxy group containing 1 to 2 carbon atoms; n represents 0 or 1, y represents 0 or 1, x and z each represent a whole number such that the sum of $x + y + Z$ is a whole number from 5 to 17.

The invention includes mixtures of such dyestuffs as well as mixtures of these dyestuffs with aliphatic or aromatic hydrocarbons, these mixtures advantageously comprising at least 40 parts of dyestuff to 60 parts of hydrocarbon, preferably 80 parts of dyestuff to 20 parts of hydrocarbon.

The dyestuffs of formula (I) may be prepared for example by coupling in aqueous medium the diazo derivative of an amine of the general formula:

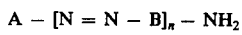
(II)

with a compound of the general formula:

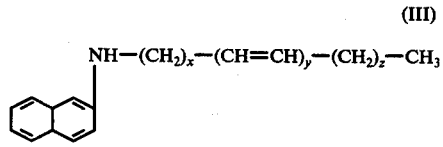
(III)

A, B, n, x, y and z having the same significance as above. Mixtures may be obtained by using several diazo derivatives and several naphthalene coupling compounds.

Among the amines of formula (II) may be mentioned aniline, 2-, 3- or 4-methyl-aniline, 2,4-dimethyl-aniline, 2.5-dimethyl-aniline, 2-methoxy-aniline, 4-methoxy-aniline, 2-ethoxy-aniline, 4-ethoxy-aniline, 2-methoxy-5-methyl-aniline, 2,4,5-trimethylaniline, 1-amino-naphthalene, 4-amino-azobenzene and its derivatives methylated in positions 2,3,2',3' or 4',4-amino-2,5-dimethyl-azobenzene, 4-amino-2',5'-dimethyl-azobenzene, 4-amino-3,2'-dimethyl-azobenzene, 4-amino-2,5,2'-trimethylazobenzene, 4-amino-3,2',5'-trimethyl-azobenzene, 4-amino-2,5,2'-5'-tetramethyl-azobenzene, 3-methoxy-4-amino-azobenzene, 4-amino-2'-methoxy-azobenzene, 4-amino-3,2'-dimethoxy-azobenzene, 3-methoxy-4-amino-2'-methyl-azobenzene, 3-methyl-4-amino-2'-methoxy-azobenzene, 3-methoxy-4-amino-2',5'-dimethyl-azobenzene and 4-amino-2,5-dimethyl-2'-methoxy-azobenzene.

Among the N-alkyl-2-amino-naphthalenes of formula (III) may be mentioned the N-hexyl, N-octyl, N-decyl, N-dodecyl, N-tetradecyl, N-hexadecyl, N-octadecyl and N-(9-octadecene-yl)-2-amino-naphthalenes.

The coupling is advantageously effected in aqueous medium at a pH of 2 to 13, preferably at a pH of 2 to 7, at a temperature from 0° C. to 25° C. The 2-N-alkylamino-naphthalene or the mixture of N-alkyl-2-amino-naphthalenes may be dispersed in water before being added to the diazo derivative. It may also be dissolved in a certain amount of solvent immiscible with water. The quantity of solvent chosen is preferably sufficient to obtain a mixture which does not contain more solvent that the desired proportion. The mixture of solvent and dyestuff is separated from the aqueous phase by decantation. The mixtures are thus directly obtained at the selected concentration without it being necessary to prepare the dyestuffs separately, isolate them, dry them and mix them with the desired solvent. The pH for the coupling is maintained constant by means of a mineral alkaline agent such as for example caustic soda, or an organic substance such as for example, pyridine, or by means of a salt of basic character such as sodium or potassium carbonate or bicarbonate or sodium acetate.

The dyestuffs according to the invention are in the form of fluid liquids at ordinary room temperature. They are miscible in all proportions with aromatic or aliphatic hydrocarbons, such as for example, benzene, toluene, ortho-, meta- and paraxylene, cumene and with petrol for motor engines, fuels, as well as with alcohols, ketones and esters.

For the colouration of the petroleum products, mixtures according to the invention comprising from 10% to 60% of hydrocarbons, preferably 20%, are particularly advantageous. In fact, these mixtures are very fluid, their viscosity being not much greater than that of the hydrocarbon itself, even at temperatures of the order of −20° C. It is therefore possible to carry out a continuous dissolution by injection into the hydrocarbons to be coloured whatever their temperature may be, the displacement of the liquids causing a sufficient agitation to given instantaneously a complete dissolution. It is however possible to use the dyestuff directly if the turbulence is sufficient.

Numerous dyestuffs which are soluble in organic solvents are already known. They are available in the form of powders which are relatively sparingly soluble in solvents, their solubility seldom exceeding 5%. Their use therefore requires the handling of large volumes of solvents. In addition, the handling of the powders is dirty and causes pollution.

Dyestuffs having a considerable solubility in hydrocarbons are known, but their manipulation is difficult, since they are generally in the form of "tars" or "tarry solids" which are not directly utilisable. Thus French Patent No. 2,039,344 describes dyestuffs obtained by coupling the diazo derivative of a benzene primary amine with the N,N'-polyethylated derivative of a benzene diamine. In addition, not only are the products obtained "thick tarry substances" but it is necessary to dry this substance, then to dissolve it in the prescribed solvent and finally to filter the solution obtained, which involves a certain number of operations.

U.S. Pat. No. 3,494,714 describes mixtures of disazo dyestuffs of which the melting point is of the order of 30° C. The preparation of concentrated solutions necessitates heating for "several hours" of 40 parts of dyestuff, 35 parts of nonylphenol and 25 parts of xylene. 40% solutions of dyestuffs are thus obtained.

U.S. Pat. No. 3,690,809 describes the dyestuffs obtained by coupling the diazo derivative of an aromatic primary amine or of an aminoazo dyestuff with a heptyl β-naphthol or with 4-nonyl-1-hydroxy-benzene. The dyestuff obtained is a soft tar which it is advisable to dry before it is dissolved in the xylene.

British Patent No. 1,142,239 describes 3-methyl-N,N-4'-diethylamino-azobenzene which enables a 35% solution to be obtained in a mixture of orthoxylene and benzene, the dyestuff being prepared and dried before it is dissolved.

German Patent Application No. 2,129,590 relates to dyestuffs prepared by condensation of non-liquid azo dyestuffs with isobutyoxyethylene. The reaction is carried out in a very dilute solution in toluene and necessitates the intermediate preparation of a dyestuff which must be dried. The final solution is not very concentrated.

German Patent Application No. 2,111,370 relates to dyestuffs whose solubility does not exceed 50%.

Compared with the dyestuffs of the above-mentioned prior art, those of the invention have numerous advantages. Since they are in liquid form, the operations of filtration, drying and grinding, which are necessary in the case of the dyestuffs whose melting point is greater than 50° C., are not necessary. As they are not tars, their separation from the reaction medium is effected by simple decantation. Finally, when solutions in any solvent are required, it is unnecessary previously to isolate the dyestuff, dry it and dissolve it. Mixtures preferably comprising 80 parts of dyestuff and 20 parts of solvent are obtained directly. These mixtures consist of liquids which are extremely fluid at all temperatures and have a concentration superior to that of the solutions described in the above mentioned prior art. These mixtures may consist of a starting mixture for the production of more dilute solutions, as for example, in the colouration of petroleum products.

The following Examples illustrate the invention, and the parts given are parts by weight unless the contrary is indicated.

EXAMPLE 1

9.3 parts of aniline are diazotised in the usual way and 22.7 parts of 2-N-hexylamino-naphthalene dispersed in 100 parts of water at 90° C. are added to the solution of the diazo derivative. A little sodium carbonate is added in order to take the pH to 3.5 and the reaction is allowed to continue at 5° C. until all the diazo derivative has reacted. Then 22.7 parts of xylene are added, the mixture is heated to 70° C. and the aqueous layer is decanted and the concentration of the dyestuff is adjusted to 50% by the addition of xylene to the mixture obtained. A solution is obtained which colours hydrocarbons in an orange shade.

If instead of dispersing the 2-N-hexylamino-naphthalene in water, it is dissolved in 22.7 parts of xylene, the same solution of 1-phenylazo-2-hexylamino-naphthalene ($\lambda$ = 494 nm) is obtained.

The sodium carbonate can be replaced by potassium carbonate, sodium bicarbonate, sodium acetate or pyridine.

Other 1-phenylazo N-alkyl-2-amino-naphthalenes may be obtained by coupling the diazo derivative of 9.3 parts of aniline with the amounts of 2-N-alkylamino-naphthalenes indicated in the Table below in solution in an equal amount of xylene. All these dyestuffs colour hydrocarbons, inks and waxes in orange shades.

Table I

| Example | 2-N-alkylamino-naphthalene | Amount used |
|---|---|---|
| 2 | 2-N-octylamino-naphthalene | 25.5 parts |
| 3 | 2-N-decylamino-naphthalene | 28.3 parts |
| 4 | 2-N-dodecylamino-naphthalene | 31.1 parts |
| 5 | 2-N-tetradecylamino-naphthalene | 33.9 parts |
| 6 | 2-N-hexadecylamino-naphthalene | 36.7 parts |
| 7 | 2-N-octadecylamino-naphthalene | 39.5 parts |
| 8 | N-(9-octadecene-yl)-2-amino naphthalene | 39.3 parts |

EXAMPLE 9

A solution of 1.7 parts of 2-N-octylamino-naphthalene, 10.9 parts of 2-N-decylamino-naphthalene, 172.5 parts of 2-N-dodecylamino-naphthalene, 60.1 parts of 2-N-tetradecylamino-naphthalene, 35.7 parts of 2-N-hexadecylamino-naphthalene and 49.6 parts of 2-N-octadecylamino-naphthalene in 330.5 parts of xylene is added to a solution of the diazo derivative of 93 parts of aniline. The pH is adjusted to 3 by means of a little sodium carbonate. When the coupling is finished, the xylene solution of the dyestuff is decanted. It colours solvents, inks and waxes in an orange shade ($\lambda$ = 500 nm).

EXAMPLE 10

If in the previous Example the mixture of N-alkylamino naphthalenes is replaced by a mixture comprising 5.7 parts of 2-N-dodecylamino-naphthalene, 9.7 parts of 2-N-tetradecylamino-naphthalene, 38.4 parts of 2-N-hexadecylamino-naphthalene, 36.2 parts of 2-N-octadecylamino-naphthalene and 299 parts of N-(9-octadecene-yl)-2-amino-naphthalene, a dyestuff of similar shade and properties is obtained.

Other dyestuffs may be prepared by the process of Example 9 by replacing the diazo derivative of aniline with the diazo derivatives of the following amines:

Table 2

| Example | Amine A—NH$_2$ | Shade | nm |
|---|---|---|---|
| 11 | 2-methyl-aniline | orange | |
| 12 | 3-methyl-aniline | orange | |
| 13 | 4-methyl-aniline | orange | |
| 14 | 2,4-dimethyl-aniline | orange | 492 |
| 15 | 2,5-dimethyl-aniline | orange | |
| 16 | 2-methoxy-aniline | orange | |
| 17 | 4-methoxy-aniline | orange | |
| 18 | 2-ethoxy-aniline | orange | |
| 19 | 4-ethoxy-aniline | orange | 496 |
| 20 | 2-methoxy-5-methyl-aniline | orange | 504 |
| 21 | 2,4,5-trimethyl-aniline | orange | |
| 22 | 1-amino-naphthalene | scarlet | 518 |

EXAMPLE 23

The operation is as in Example 9, but on the one hand the aniline is replaced by a mixture comprising 46.5 parts of aniline, 30.25 parts of 2,4-dimethyl-aniline and 34.5 parts of 4-ethoxy-aniline, and on the other hand the 330.5 parts of xylene are replaced by 99.1 parts of the same solvent. A liquid mixture comprising more than 80% of dyestuff (λ = 492 nm) is obtained. It colours hydrocarbons, inks and waxes in an orange shade. The mixture is stable, even at temperatures of the order of −20° C.

EXAMPLE 24

The mixture of 2-N-alkylamino-naphthalenes of Examples 23 is dispersed in 1000 parts of water at 50° C. instead of dissolving it in xylene. The same dyestuff composition is obtained which is without any solvent. This dyestuff is liquid and remains so even at very low temperatures of the order of −20° C.

EXAMPLE 25

If in Example 23 the mixture of 2-N-alkylamino-naphthalenes is replaced by that indicated in Example 10, a liquid mixture is obtained which comprises more than 80% of dyestuff (λ = 492 nm) and it has a shade and properties similar to those of the dyestuff of Example 23.

EXAMPLE 26

If in Example 9 the aniline is replaced by 197 parts of 4-amino-azobenzene, a solution is obtained comprising more than 50% of dyestuff and which colours hydrocarbons, inks and waxes in a bluish red shade. The solution is extremely stable, even at very low temperatures of the order of −20° C.

Other disazo dyestuffs can be prepared according to the process of Example 9 by replacing the diazo derivative of the aniline by the diazo derivative of an aminoazobenzene of the following Table:

Table 3

| Example | A—N=N—B—NH$_2$ | Shade |
|---|---|---|
| 27 | 2-methyl-4-amino-azobenzene | bluish red |
| 28 | 3-methyl-4-amino-azobenzene | bluish red |
| 29 | 2'-methyl-4-amino-azobenzene | bluish red |
| 30 | 3'-methyl-4-amino-azobenzene | bluish red |
| 31 | 4'-methyl-4-amino-azobenzene | bluish red |
| 32 | 4-amino-2,5-dimethyl-azobenzene | bordeaux |
| 33 | 4-amino-2',5'-dimethyl-azobenzene | bordeaux |
| 34 | 4-amino-3,2'-dimethyl-azobenzene | bordeaux |
| 35 | 4-amino-2,5,2'-trimethyl-azobenzene | bordeaux |
| 36 | 4-amino-3,2',5'-trimethyl-azobenzene | bordeaux |
| 37 | 4-amino-2,5,2',5'-tetramethyl-azo-benzene | bordeaux |
| 38 | 3-methoxy-4-amino-azobenzene | violet |
| 39 | 4-amino-2'-methoxy-azobenzene | violet |
| 40 | 4-amino-3,2'-dimethoxy-azobenzene | violet |
| 41 | 4-amino-3-methoxy-2'-methyl-benzene | violet |
| 42 | 4-amino-3-methyl-2'-methoxy-azobenzene | violet |
| 43 | 4-amino-3-methoxy-2',5'-dimethyl-azo-benzene | violet |
| 44 | 4-amino-2,5-dimethyl-2'-methoxy-azobenzene | violet |

EXAMPLE 45

If in Example 9, on the one hand, the aniline is replaced by a mixture comprising 21.9 parts of 4-amino-azobenzene, 46.9 parts of 4-amino-2'-methyl-azobenzene, 46.9 parts of 3-methyl-4-amino-azobenzene and 100 parts of 4-amino-3,2'-dimethyl-azobenzene and, on the other hand, the 330.5 parts of xylene are replaced by 99.1 parts of the same solvent, a liquid mixture comprising more than 80% of dyestuff (λ = 536nm) is obtained. It colours hydrocarbons, inks and waxes in a bluish red shade. The mixture is perfectly stable even at temperatures of the order of −20° C.

EXAMPLE 46

If the mixture of 2-N-alkylamino-naphthalenes used in Example 45 is dispersed in 1000 parts of water at 50° C. instead of dissolving it in xylene, there is obtained under the conditions of this Example, the same dyestuff composition, free from any solvent.

EXAMPLE 47

If the mixture of the 2-N-alkylamino-naphthalenes used in Example 46 is replaced by that indicated in Example 10, there is obtained under the conditions of Example 46 a liquid dyestuff (λ = 532 nm) free from any solvent with similar shade and properties.

We claim:
1. Liquid dyestuff of the formula:

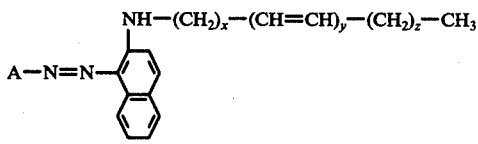

in which A represents phenyl or naphthyl, which is unsubstituted or substituted by at least one alkyl or alkoxy group containing 1 to 2 carbon atoms, y represents 0 or 1, x and z each represent a whole number such that the sum $x + y + z$ is a whole number from 5 to 17.

2. A dyestuff as claimed in claim 1 of the formula:

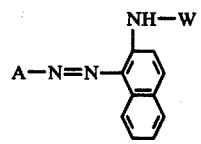

in which A has the same significance as in claim 1 and W represents:
—(CH$_2$)$_5$—CH$_3$, —(CH$_2$)$_7$—CH$_3$, —(CH$_2$)$_9$—CH$_3$, —(CH$_2$)$_{11}$—CH$_3$,
—(CH$_2$)$_{13}$—CH$_3$, —(CH$_2$)$_{15}$—CH$_3$, —(CH$_2$)$_{17}$—CH$_3$ or —(CH$_2$)$_8$—CH=CH—(CH$_2$)$_7$—CH$_3$.

3. A mixture of dyestuffs each having the formula given in claim 1.

4. A mixture of an aliphatic or aromatic hydrocarbon and at least one dyestuff of the formula given in claim 1.

5. A mixture according to claim 4 wherein there are at least 40 parts of dyestuff to 60 parts of hydrocarbon.

6. A mixture according to claim 4 wherein there are 80 parts of dyestuff to 20 parts of hydrocarbon.

7. A mixture according to claim 4 wherein the hydrocarbon is xylene.

8. A mixture according to claim 4, wherein said hydrocarbon is a petroleum product.

* * * * *